United States Patent
Kursun

(10) Patent No.: US 11,270,206 B2
(45) Date of Patent: Mar. 8, 2022

(54) INCREMENTAL LEARNING THROUGH STATE-BASED REAL-TIME ADAPTATIONS IN ARTIFICIAL INTELLIGENCE SYSTEMS

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 717 days.

(21) Appl. No.: 16/197,197

(22) Filed: Nov. 20, 2018

(65) Prior Publication Data

US 2020/0160184 A1    May 21, 2020

(51) Int. Cl.
*G06N 3/08* (2006.01)
*G06N 3/04* (2006.01)

(52) U.S. Cl.
CPC ............ *G06N 3/082* (2013.01); *G06N 3/04* (2013.01)

(58) Field of Classification Search
CPC .................................. G06N 3/082; G06N 4/04
USPC ........................................................ 706/25
See application file for complete search history.

(56) References Cited

U.S. PATENT DOCUMENTS

| 5,835,901 A | 11/1998 | Duvoisin, III et al. |
| 10,373,249 B2 * | 8/2019 | Kanjlia ............... G06Q 20/227 |
| 2017/0118479 A1 * | 4/2017 | Kurokawa ........ H01L 29/78642 |
| 2019/0130277 A1 * | 5/2019 | Andoni .................. G06N 3/084 |

OTHER PUBLICATIONS

Lee, et al., "Structure Level Adaptation for Artificial Neural Networks", Springer Science+Business Media, LLC, 1991 (Year: 1991).*
Zhang et al., "On Momentum and Learning Rate of the Generalized ADLINE Neural Network for Time Varying System Identification", International Symposium on Neural Networks—ISNN2009, pp. 1002-1013 (Year: 2009).*

* cited by examiner

*Primary Examiner* — Tsu-Chang Lee
(74) *Attorney, Agent, or Firm* — Moore & Van Allen PLLC; R. W. McCord Rayburn

(57) ABSTRACT

A system for reconfiguring neural network architecture responsive to a system state is provided. A controller for modifying a neural network learning engine is configured to monitor a data stream having a data pattern by comparing the data pattern to a trained data pattern; identify a change in the data pattern of the data stream; determine a state of the neural network learning engine, the state defining one or more neural network parameters for monitoring the data stream with the neural network learning engine; and in response to identifying the change in the data pattern and determining the state, reconfigure an architectural configuration of the neural network learning engine by modifying the one or more neural network parameters.

20 Claims, 6 Drawing Sheets

FIG. 4

```
402 SYSTEM IS PRE-TRAINED WITH BROAD SPECTRUM REPRESENTATIVE DATA
  ↓
404 INCOMING DATA STREAM ASSESSED BY CONTROLLER ←─────┐
  ↓                                                    │
406 CURRENT CONFIGURATION ASSESSED BY CONTROLLER       │
  ↓                                                    │
408 ALTERNATIVE CONFIGURATION? ──NO────────────────────┘
  │ YES
  ↓
410 LOOK UPS IN SYSTEM, STATE, AND CONFIGURATION SETTINGS
      ↕           ↕           ↕
  410A         410B         410C
  SYSTEM-BASED  STATE-BASED   CONFIGURATION-BASED
  SETTINGS      SETTINGS      SETTINGS
  (E.G., ENERGY (E.G.,        (E.G., POLICY,
  EFFICIENCY,   ADVERSARIAL,  CONDITIONS CHANGES,
  RESPONSE TIME,LEARNING/     SPECIFICATIONS, RISK
  FAIRNESS,     ADAPTIVENESS, AND PERFORMANCE
  REGULATORY    ALERTNESS,    METRICS)
  GUIDELINES,   ROBUSTNESS)
  ETC.)

412 EVALUATION OF STRATEGIC ALTERNATIVES AND DECISIONS BASED ON
    SYSTEM, STATE, AND CONFIGURATION SETTINGS
```

INCREMENTAL LEARNING THROUGH STATE-BASED REAL-TIME ADAPTATIONS IN ARTIFICIAL INTELLIGENCE SYSTEMS

BACKGROUND

Modern deep learning techniques leveraging neural network architectures are applied across a wide range of fields to analyze complex data and output conclusive results. Solution techniques utilized by neural networks (e.g., gradient descent) typically depend on training data to optimize and weight the neural network architecture. However, dependence on static training data alone limits the ability of the architecture to adapt to changing real-world environments, as it is not able to dynamically learn from newly received environmental data. Furthermore, current architecture and techniques are limited to learning from large data sources. These limitations reduce the effectiveness of current deep learning systems in certain implementations wherein real-time, subtle data changes can be of particular importance (e.g., cybersecurity, intrusion detection, misappropriation detection). Therefore, there exists a need for an improved, situationally-aware deep learning technology that is sensitive to small data sources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for incremental state-based learning utilizing neural networks. In one embodiment, an artificial intelligence system for reconfiguring system architecture responsive to a system state is provided. The system comprises a controller configured for modifying an artificial intelligence learning engine, the controller comprising at least one memory device with computer-readable program code stored thereon, at least one communication device connected to a network, and at least one processing device, wherein the at least one processing device is configured to execute the computer-readable program code to: monitor a data stream having a data pattern by comparing the data pattern to a trained data pattern; identify a change in the data pattern of the data stream; assess a fidelity of the data stream based on the change in the data pattern; and determine an adaptation rate of the artificial intelligence learning engine to the data stream based on the fidelity of the data stream; in response to the fidelity of the data stream and the adaptation rate of the artificial intelligence learning engine, reconfigure the artificial intelligence learning engine by modifying at least one of a response state or an architectural configuration of the artificial intelligence learning engine.

In one embodiment, determining the adaptation rate of the artificial intelligence learning engine further comprises identifying that the fidelity of the data stream is below a predetermined threshold and, in response, decreasing a learning rate of the artificial intelligence engine for streaming data received from the data stream.

In another embodiment, decreasing the learning rate of the artificial intelligence engine comprises weighting predetermined training data higher than the streaming data received from the data stream.

In yet another embodiment, modifying the architectural configuration of the artificial intelligence learning engine comprises modifying a neural network architecture comprising modifying a number of neurons participating in the neural network, modifying a weight of a neuron participating in the neural network, modifying a weight of an edge within the neural network, modifying an ensemble including the neural network, modifying a macroinstruction, or modifying an activation function.

In yet another embodiment, modifying the architectural configuration of the artificial intelligence learning engine is based on one or more neural network parameters defined by the response state of the artificial intelligence learning engine.

In yet another embodiment, the weight of the neuron or the edge in the neural network is continually modified during an iterative reconfiguration process, wherein the weight is continually modified based on at least one of the response state and the data stream.

An artificial intelligence system for reconfiguring system architecture responsive to a system state is also provided. The system comprises a controller configured for modifying an artificial intelligence learning engine, the controller comprising at least one memory device with computer-readable program code stored thereon, at least one communication device connected to a network, and at least one processing device, wherein the at least one processing device is configured to execute the computer-readable program code to: monitor a data stream having a data pattern by comparing the data pattern to a trained data pattern; identify a change in the data pattern of the data stream; determine a response state of the artificial intelligence learning engine, the response state defining one or more neural network parameters for monitoring the data stream with the artificial intelligence learning engine; and in response to identifying the change in the data pattern and determining the response state, reconfigure an architectural configuration of the artificial intelligence learning engine by modifying the one or more neural network parameters based on the response state.

In one embodiment, reconfiguring the architectural configuration of the artificial intelligence learning engine comprises modifying a neural network architecture comprising modifying a number of neurons participating in the neural network, modifying a weight of a neuron participating in the neural network, modifying a weight of an edge within the neural network, modifying a macroinstruction, or modifying an activation function.

In another embodiment, the number of neurons participating in the artificial intelligence learning engine are modified incrementally from a first total number of neurons to a second total number of neurons as the artificial intelligence learning engine learns from the data stream over a period of time.

In yet another embodiment, the number of neurons participating in the artificial intelligence learning engine are modified based on a number of inputs received by the artificial intelligence learning engine.

In yet another embodiment, the weight of the neuron or the edge within the artificial intelligence learning engine is continually modified during an iterative reconfiguration process, wherein the weight is continually modified based on at least one of the state and the data stream.

In yet another embodiment, the at least one processing device is further configured to form or disband an ensemble of the artificial intelligence learning engine and one or more additional neural networks based on at least one of the response state and the data stream.

In yet another embodiment, reconfiguring the architectural configuration of the artificial intelligence learning engine further comprises modifying a depth of the artificial intelligence learning engine, wherein the at least one processing device is further configured to modify a number of layers within the artificial intelligence learning engine.

In yet another embodiment, modifying the number of layers within the artificial intelligence learning engine further comprises modifying at least one of an input layer, an output layer, and a hidden layer of the artificial intelligence learning engine.

In yet another embodiment, reconfiguring the architectural configuration of the artificial intelligence learning engine improves energy efficiency of computing hardware associated with the artificial intelligence learning engine.

In yet another embodiment, the at least one processing device is further configured for: determining a new state of the artificial intelligence learning engine; and in response to determining the new response state, reconfiguring the architectural configuration of the artificial intelligence learning engine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
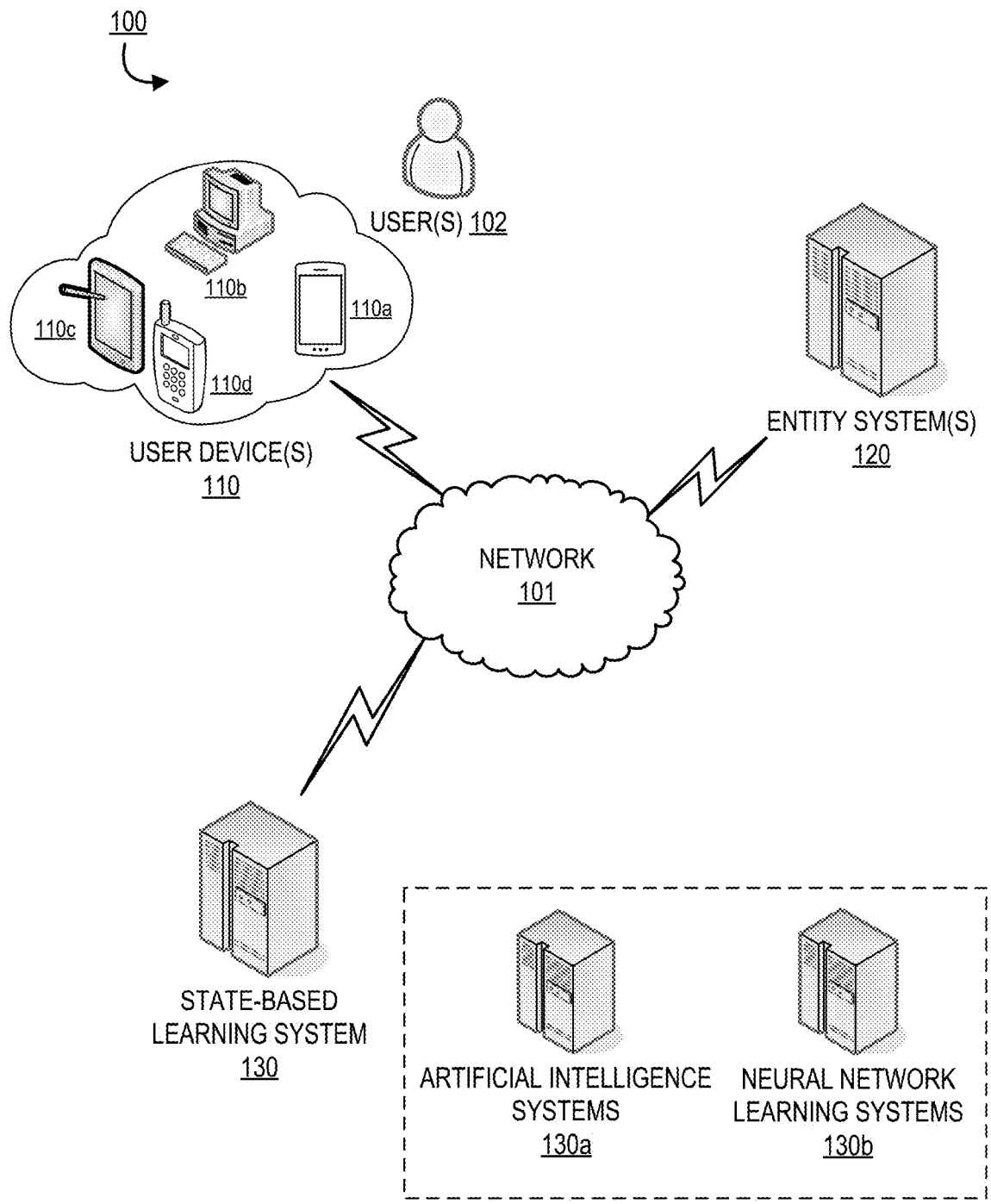
Figure 2:
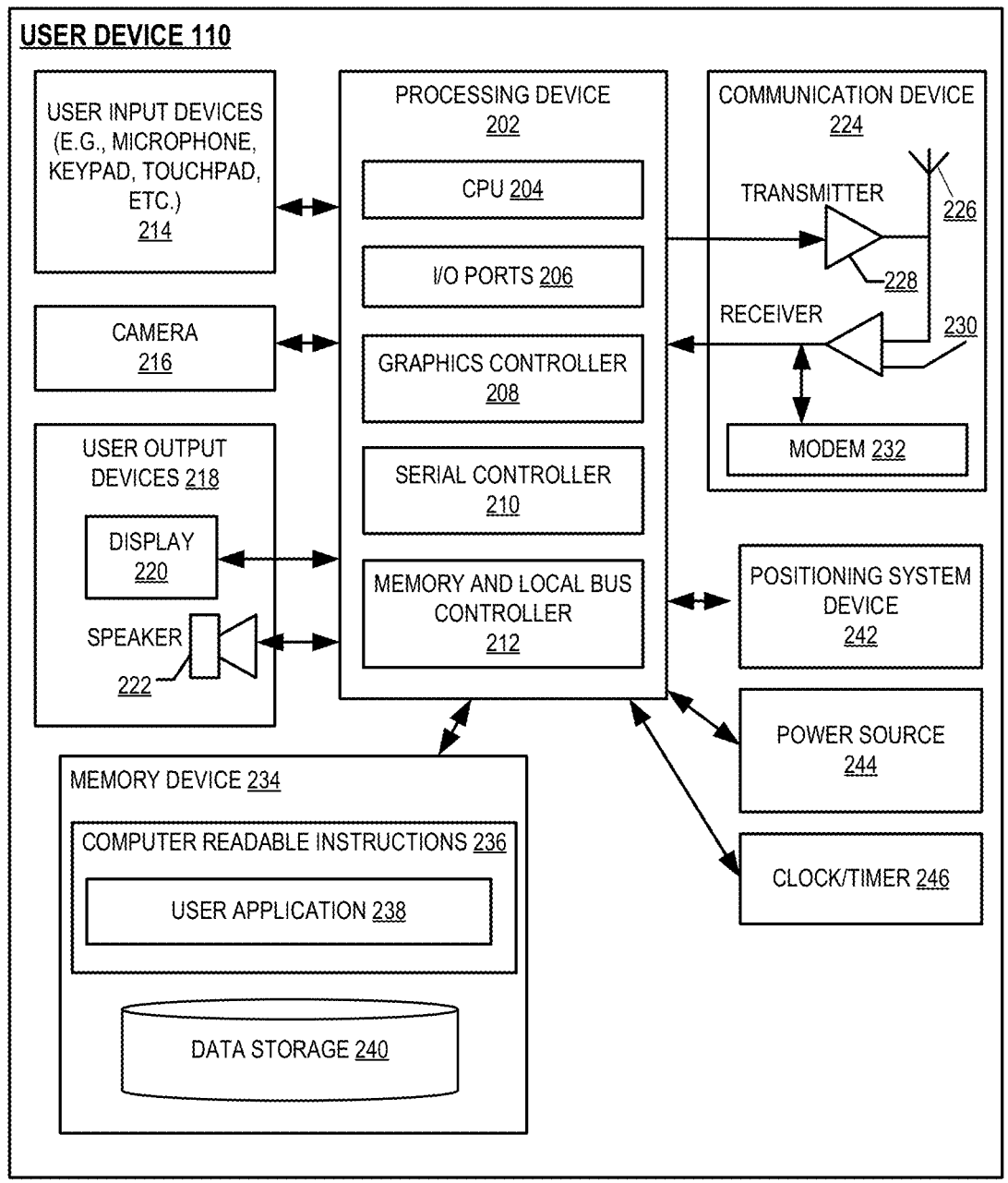
Figure 3:
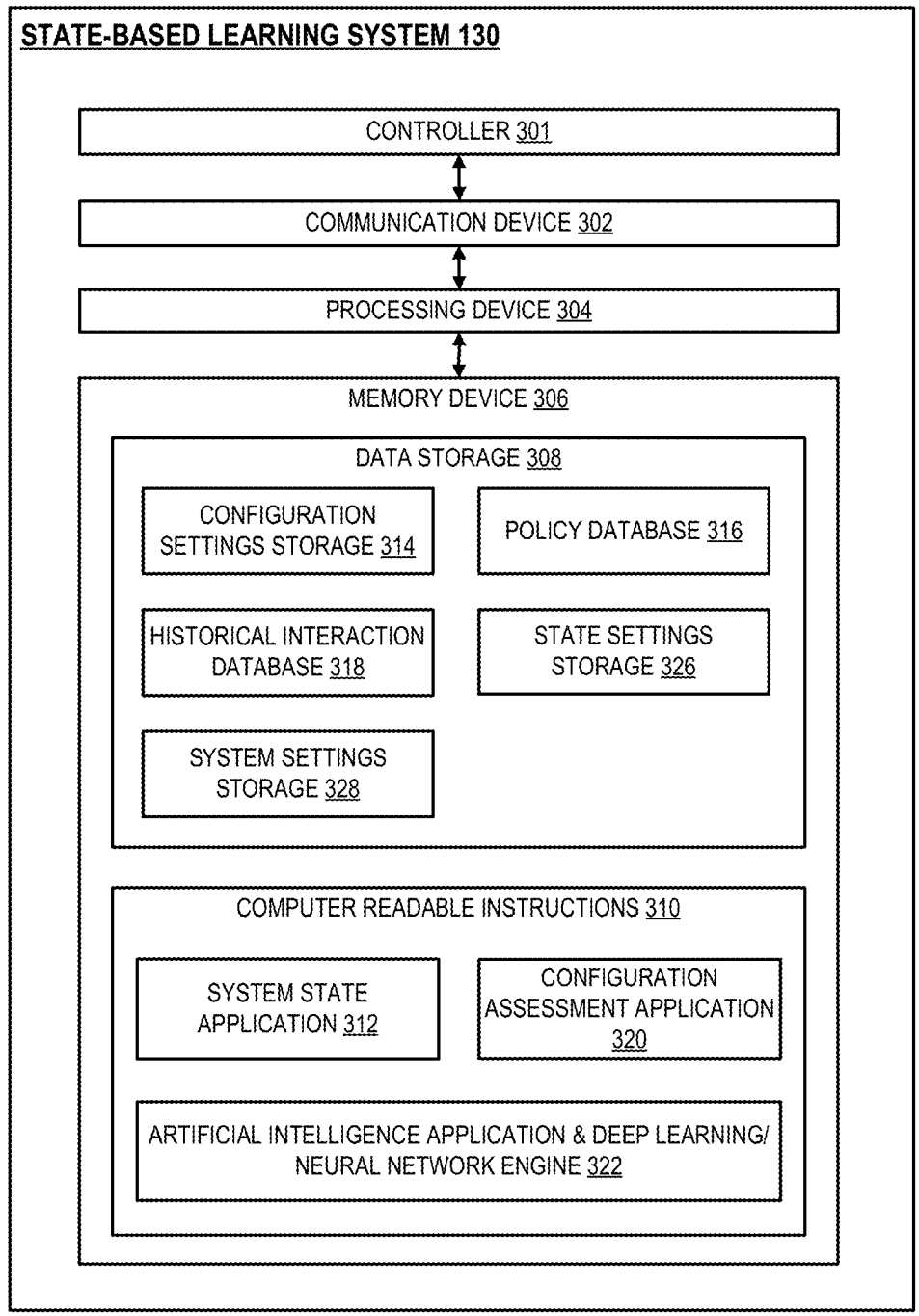
Figure 5:
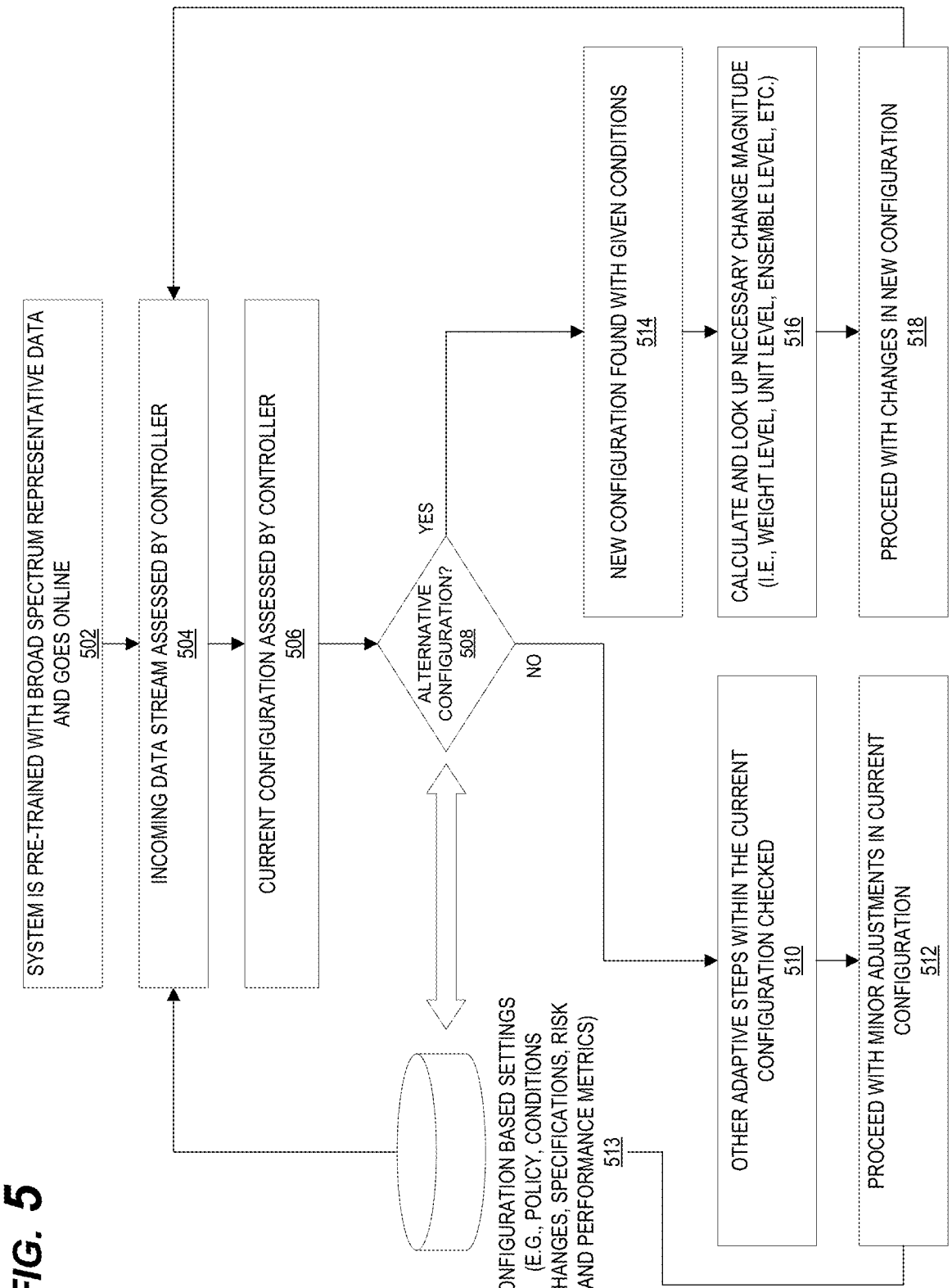
Figure 6:
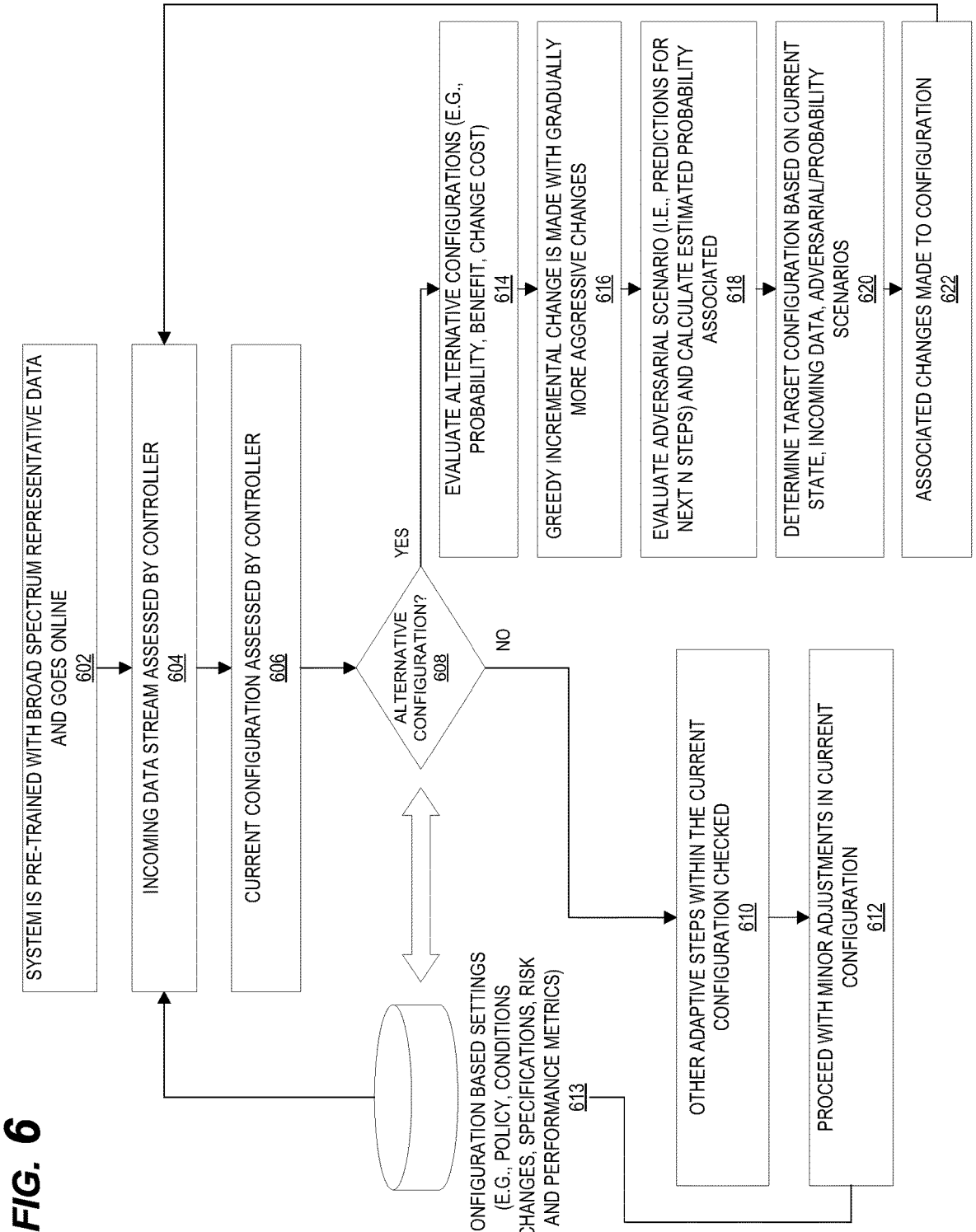

Having thus described embodiments of the invention in general terms, reference will now be made to the accompanying drawings, wherein:

FIG. 1 provides a state-based learning system environment, in accordance with one embodiment of the invention;

FIG. 2 provides a block diagram of a user device, in accordance with one embodiment of the invention;

FIG. 3 provides a block diagram of a state-based learning system, in accordance with one embodiment of the invention;

FIG. 4 provides a high level process map for system assessment and reconfiguration, in accordance with one embodiment of the invention;

FIG. 5 provides a high level process map for pre-trained incremental learning with system assessment and reconfiguration, in accordance with one embodiment of the invention; and FIG. 6 provides a high level process map for hybrid incremental learning with system assessment and reconfiguration, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the system, as described herein leverage artificial intelligence, machine-learning, neural networks, and/or other complex, specific-use computer systems to provide a novel approach for training neural network systems for processing complex data streams in real-time. Modern deep learning techniques are limited to learning from only large data sources which prove ineffective in key application areas such as misappropriation detection, cyber-security, intrusion detection and the like where subtle changes in data patterns are important. State-based learning systems, as described herein, allow for learning rate adaption based on changes to environmental conditions such as a detected change in an incoming data stream. By leveraging state-based learning modes to enable a particular incremental learning technique, the system becomes receptive to small data samples allowing the system to adapt to a changing environment without the need to completely recalibrate the system (i.e., complete retraining of the neural network). Additionally, the systems described herein are configured for restructuring or reconfiguring neural network architecture based on a system state or a detected change in a data pattern of a data stream. As such, the present invention provides a technical improvement to machine deep learning and neural network technologies.

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, or any combination of the aforementioned. The device may be used by the user to access the system directly or through an application, online portal, internet browser, virtual private network, or other connection channel.

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the state-based learning system. In some embodiments, a user may be a computing device user, a phone user, a mobile device application user, a customer of an entity or business, a financial institution customer (e.g., an account holder or a person who has an account (e.g., banking account, credit account, or the like)), a system operator, a customer service representative, and/or employee of an entity. In a specific embodiment, a user may be a customer accessing a user account via an associated user device. In another specific embodiment, the user is a victim of potential unauthorized system and/or account access or misappropriation by another individual. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein, the term "entity" may be used to include any organization or collection of users that may interact with the state-based learning system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In one embodiment, the entity may be a software development entity or data management entity. In a specific embodiment, the entity may be a cybersecurity entity or misappropriation prevention entity.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, database, or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module may monitor a user input in the system. In further embodiments, the system may store said user input during an interaction in order to generate a user interaction report that characterizes regular, common, or repeated interactions of the user with the system. In some embodiments, "monitoring" may further comprise analyzing or performing a process on something such as a data source either passively or in response to an action or change in the data source.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. An interaction may include user interactions with a user interface (e.g., clicking, swiping, text or data entry, etc.), authentication actions (e.g., signing-in, username and password entry, PIN entry, etc.), account actions (e.g., account access, fund transfers, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In some embodiments, as discussed herein, a user interaction may include a user communication which may be analyzed using natural language processing techniques or the like.

FIG. 1 provides a state-based learning system environment 100, in accordance with one embodiment of the invention. As illustrated in FIG. 1, the state-based learning system 130 is operatively coupled, via a network 101, to the user device(s) 110 (e.g., a plurality of user devices 110a-110d) and the entity system 120. In this way, the state-based learning system 130 can send information to and receive information from the user device 110 and the entity system 120. In the illustrated embodiment, the plurality of user devices 110a-110d provide a plurality of communication channels through which the entity system 120 and/or the state-based learning system 130 may communicate with the user 102 over the network 101.

In the illustrated embodiment, the state-based learning system 130 further comprises an artificial intelligence (AI) system 130a and a neural network learning system 130b which may be separate systems operating together with the state-based learning system 130 or integrated within the state-based learning system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow between the user device 110 and the entity system 120 is monitored by the state-based learning system 130 over the network 101. In some embodiments a user 102 is a user requesting service from the entity (e.g., customer service) or interacting with an account maintained by the entity system 120. In an alternative embodiment, the user 102 is an unauthorized user attempting to gain access to a user account of an actual, authorized user (i.e., misappropriation).

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is an online banking application providing access to the entity system 120 wherein the user may interact with a user account via a user interface of the user application 238.

The processing device 202 may be configured to use the communication device 224 to communicate with one or more other devices on a network 101 such as, but not limited to the entity system 120 and the state-based learning system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the state-based learning system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the state-based learning system 130 to provide access to one or more user accounts stored and maintained on the entity system 120. In some embodiments, the entity system 120 may communicate with the state-based learning system 130 during an interaction with a user 102 in real-time, wherein user interactions may be monitored and processed by the state-based learning system 130 in order to analyze interactions with the user 102 and reconfigure a neural network architecture in response to changes in a received or monitored data stream.

FIG. 3 provides a block diagram of a state-based learning system 130, in accordance with one embodiment of the invention. The state-based learning system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the state-based learning system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the state-based learning system 130 comprises computer-readable instructions 310 stored in the memory device 306, which in one embodiment includes the computer-readable instructions 310 of a system state application 312, a configuration assessment application 320, and an artificial intelligence application 322 which further comprises a deep learning/neural network engine. In one embodiment, the artificial intelligence application 322 and deep learning/neural network engine may be utilized by the system state application 312 and/or configuration assessment application 320 to monitor an incoming data stream and determine a system state and/or reconfigure the neural network architecture in response to changes in the data stream.

In some embodiments, the memory device 306 includes data storage 308 for storing data related to the system environment, but not limited to data created and/or used by the system state application 312, configuration assessment application 320, an artificial intelligence application 322, and a deep learning/neural network engine such as the historical interaction database 318, policy database 316, configuration settings storage 314, state setting storage 326, and the system settings storage 328.

The historical interaction database 318 is used to store information regarding past interactions (e.g., account actions, transactions, communications, inputs) with the user 102. In some embodiments, the historical interaction database 318 may be configured to store data from an incoming data stream in real-time. In some embodiments, the policy database 316 is configured to stored defined or predetermined conditions or rules for neural network configuration changes along with specification for each possible configuration. In some embodiments, the policy database 316 is configured to store probability metrics, system performance metrics, cost metrics, benefit metrics, cost-change metrics, adversarial scenarios, and the like associated with one or more configurations. In some embodiments, the policy database 316 and/or the historical interaction database 318 include pre-existing training data for supplying to train a neural network or artificial intelligence.

The state settings storage 326 is configured to store one or more states of the system which may be used to determine system response and a configuration of a neural network architecture. In some embodiments, state settings storage 326 and/or the system state application 312 may include an adversarial function configured for providing adversarial learning and modeling to the system by introducing unreliable or erroneous data to the system; a learning or adaptation function for defining system response to data changes or an adaptation rate for implementing changes (i.e., changes to learning rate, response states, neural network configurations) within an architecture of the systems described herein; and an alertness function and robustness function for defining an appropriate system reaction, response, or extent of system reaction based on one or more environmental conditions or previous interactions.

The configuration settings storage 314 is configured to store configurations of the neural network architecture. In some embodiments the configurations settings storage 314 includes policies, conditions, or rules for selection configurations as well as specifications for the configurations themselves. In some embodiments, the configuration settings storage 314 includes probability and/or performance metrics and the like associated with various configurations. In some embodiments, the system settings storage 328 is configured for storing settings associated with the system itself such as energy efficiency settings, response time settings, regulatory guidelines, and the like. In some embodiments, the system settings stored in the system settings storage 328 are system settings associated with one or more configurations of the neural network architecture. In one embodiment, the policy database 315 includes the configuration settings storage 314, state settings storage 326, and/or system settings storage 328.

In one embodiment of the invention, the state-based learning system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the state-based learning system 130 further comprises a dynamic optimization algorithm to be executed by the processing device 304 or a controller for reconfiguring a neural network based on, for example, parameters such as the state and/or configuration settings described herein. That said, the algorithm may further include a data pattern of a streamed data source or the like during an assessment of an optimal reconfiguration. The dynamic optimization algorithm may further receive the data stream and identified changes to the data stream in real-time for determining reconfigurations.

Embodiments of the state-based learning system 130 may include multiple systems, servers, computers or the like maintained by one or many entities. In some embodiments, the state-based learning system 130 may be part of the entity system 120. In other embodiments, the entity system 120 is distinct from the interaction monitoring system 130. The state-based learning system 130 may communicate with the entity system 120 via a secure connection generated for secure encrypted communications between the two systems either over the network 101 or alternative to the network 101.

The present system, such as the state-based learning system 130, utilizes a plurality of system states to influence system learning and, in some embodiments, reconfiguration of the neural network architecture. Shifting between system states allows for adaption of the system in response to changes in environmental conditions in real-time. The system may utilize a plurality of states to define or determine a response of the system under different determine environmental conditions. Using these response states, the system may adapt to changes in the environmental conditions such as changes in a data pattern or characteristics of receive data. A "state," as used herein, is a mode of operation or configuration of the system or the neural network maintained by the neural network engine having one or more specified neural network parameters. Examples of parameters associated with a particular state may include an incremental learning rate and an effect or impact of individual data points. In some embodiments, a current state may further define additional state changes from the current state based on the current state itself and/or the data received and analyzed from the data stream. In a particular embodiment, system states may be emotional states of the system which adjust the state parameters and determine one or more system reactions to incoming data.

A learning rate of the neural network determines how quickly the neural network identifies a change in a data pattern of a data stream and converges on a conclusion based on the data. Lower learning rates are generally more reliable, however optimization (e.g., through gradient descent) takes more steps and time. Alternatively, higher learning rates take less time but are less reliable, wherein an optimization may overshoot a solution. Data points added under a higher learning rate may have greater impact than those under a lower learning rate. In some embodiments of the present invention, the system may include a adaptiveness function configured to dynamically adjust learning rate over time. For example, the system may initially set a large learning rate which is gradually decreased to allow for fine-tuning and convergence on a solution. By initially using a larger learning rate before a smaller one, the system may reduce the amount of time need to reach a conclusion, therefore using fewer computing resources.

In some embodiments, the parameters of a state may include defined neural network architecture reconfigurations or system level adaptations associated with states. Neural network architecture refers to an interconnected group of artificial neurons or nodes that process information and make decisions according to mathematical or computational models. Connections between neurons, also known as edges, transmit signals from one neuron to the next. Neurons and edges may be weighted by the system to emphasize the impact or contribution of particular data points to a solution over others. Transmitted signals are received and processed by additional neurons. Artificial neurons are collected in layers which may each be configured for different tasks or functions (e.g., data processing). Neural networks are generally configured to have an input layer, one or more intermediate hidden layers, and an output layer. For example, a first input layer may receive a signal and transmit the signal through one or more intermediate hidden layers before being transmitted to a last output layer. The one or more hidden layers are configured to process the received data and transform it into a requested format for output. An output of each neuron is defined by an activation function which may be based on one or more inputs or desired outputs.

In some embodiments, multiple neural networks may be joined together to form an ensemble and may be jointly used to solve a problem. Neural networks can be trained based on predetermined training data and/or new data acquired in real-time, wherein the network learns from the data by dynamically identifying patterns as the information is received and processed. In some embodiments of the present invention, a neural network may be adaptive, wherein the structure of the neural network can be reconfigured based on different environmental conditions. Neural network components (e.g., neurons; edges; layers; ensembles; weights of neurons, edges, layers, or ensembles; activation functions and the like) may be modified by the system depending on an event, environmental conditions (e.g., the received data stream), or a mode of the system (e.g., a system state). Neural networks may be modified by the system by having one or more components added, removed, made inactive, or the like. The system may further modify the functioning or operation of the one or more components of the neural network. For example, the system may add additional neurons to the neural network. In another example, the system may weight particular edges more than others. In some embodiments, configurations of the system include neural network configurations having various modified components. In some embodiments, a neural network may be reconfigured into a particular configuration in response to a system state and/or content of a data stream.

FIG. 4 provides a high level process map for system assessment and reconfiguration, in accordance with one embodiment of the invention. The system, such as the state-based learning system 130, is configured to monitor a data stream received by the system. In some embodiments, interactions performed between the user device(s) 110 and the entity system 120 are intercepted and monitored by the state-based learning system 130, wherein user interaction data may be extracted from an interaction over the network 101 by the state-based learning system 130 in order to determine configuration and state-based learning settings. Data monitored and/or extracted by the system may include, in a non-limiting example, user identifying information, communication history, transaction history, and the like. Data, such as user interaction data, may be acquired from across communication channels of an entity such as phone lines, text messaging systems, email, applications (e.g., mobile applications), websites, ATMs, card readers, call centers, electronic assistants, instant messaging systems, interactive voice response (IVR) systems, brick-and-mortar locations and the like. In some embodiments, data is continuously monitored and/or collected in real-time as interactions occur. In this way, the system may learn and be reconfigured dynamically to account for small data sources or subtle changes to the received data stream.

Data, such as the previously discussed interaction data, is received by the system (e.g., state-based learning system 130) through a data stream transmitted over a network (e.g., network 101). As previously discussed, the data stream may include both previously known historical data as well as new data received and processed by the system in real-time. The real-time data may be data collected and analyzed by the system and used for learning and decisioning. In some embodiments, the real-time data may be used to at least partially determine a current or new state of the system or reconfigure the architecture of a neural network. The historical data may include previously stored data collected by the system. In some embodiments, the historical data includes predetermined training data used to at least initially pre-train the system with representative data for a desired output. In other embodiments, the predetermined data may be relied upon solely to acquire a predictable output. As will be discussed, the system may utilize the real-time data and the historical data either alone or in combination with one another for learning and decisioning.

Non-limiting examples of data monitored within the data stream include information regarding past, current, or scheduled transactions associated with the user. Transaction information may include transaction amounts, payor and/or payee information, transaction dates and times, transaction locations, transaction frequencies, and the like. In some embodiments, data may include information regarding account usage. For example, the data stream may include information regarding usage of a credit or debit card account such as locations or time periods where the card was used. In another example, the data may further include merchants with whom the user frequently interacts. In other non-limiting embodiments, the data stream includes non-financial data such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like).

In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes). In some embodiments, the system may determine a state or configuration of the neural network based on the data characteristics. In one embodiment, for example, in response to determining a low fidelity of the data below a predetermined threshold (i.e., unreliable data), the system may change to a state having higher alertness, a lower learning rate, and/or otherwise be configured to operate in the presence of adversarial data. In some embodiments, the system may assess the fidelity of data within the data stream to determine an adaptiveness or adaptation rate of an artificial intelligence or neural network system. In one example, in response to an identified low fidelity of streaming data, the system may lower a learning rate so that an impact of low fidelity or erroneous data may be decreased. Further, the system may increase a weighting of predetermined training data in response to identifying low fidelity streaming data received in the data stream. In other embodiments, the system may increase learning rate in response to a fidelity of the data being above a predetermined threshold. Low fidelity or erroneous data may be identified by comparing incoming streaming data to learned data patterns, wherein the low fidelity or erroneous data may be identified as a detected aberration in the data pattern. In some embodiments, the learned data patterns are pretrained data patterns. In other embodiments, the learned data patterns are learned by the system in real-time based on the streaming data.

As illustrated in block 402, the system is initially pre-trained with broad spectrum representative data allowing the system to identify one or more data patterns in the data stream and providing a baseline for the system's initial understanding and further learning. While state-of-the-art deep learning systems are primarily trained with pre-existing data, in some embodiments, the present system is further configured to assess an incoming data stream in real-time in conjunction with predetermined assessment means (i.e., pre-training and predefined policies). In this way, the system may adapt to changing environmental conditions and learn from a situation dynamically without need to recalibrate the overall system.

As illustrated in block 404, the system monitors and assess the incoming data stream. In some embodiments, assessing the data stream may comprise comparing a determined data pattern to a trained data pattern from the predetermined data to identify changes in the data pattern which may require action by the system. In some embodiments, changes in the data pattern may include data that contradicts or is incorrect compared to historical interaction records or an established data pattern which may require action or be an indicator of a potential security threat or misappropriation. For example, erroneous or inconsistent data may include an incorrectly provided or spelled password, PIN number, account information, or the like. Erroneous data may further include abnormal user interactions that are dissimilar from the patterns established in the user report. For example, the system may detect that the user is accessing an account via an unrecognized user device. In other embodiments, the system monitors the data stream from any change to a determined data pattern which may trigger additional action or require a response from the system (e.g., a state change or reconfiguration).

As illustrated in block 406, the system additionally assesses a current configuration of the system in response to an identified change in the data pattern of the data stream. In some embodiments a configuration may refer to a state of the system and/or the neural network. While assessing the configuration, as illustrated in 408 the system determines if there is an alternative configuration which may improve performance of the system based on the current state, configuration, data stream, environmental conditions and the like. In the illustrated embodiments, if no alternative configuration is found or made available, the system returns to block 404 to continue monitoring and assessing the incoming data stream under the current state and configuration. That said, when evaluating strategic alternatives settings 412, the system is configured to reference system-based settings 410A, state-based settings 410B, and configuration-based settings 410C.

In one embodiment, system-based settings 410A include settings related to energy efficiency (e.g., hardware energy use), response time, fairness, regulatory guidelines and policies, and the like. State-based settings 410B include adversarial settings, learning rate or adaptiveness settings, alertness settings, robustness settings, and the like. In one embodiment of the state-based settings, robustness may be tied to a robustness function configured for determining erroneous input based on the data stream and the current state. In another embodiments, alertness is determined by an alertness function configured for determining an impact of newly received data in the data stream as well as subsequent reactions to the new data based on the system state. Configuration settings 410C include policy settings, settings or conditions for enacted configuration changes, specifications for configurations, probability and performance metrics, and the like.

Assessment of the current configuration and possible reconfiguration to an alternative configuration may be at least partially influenced or based on a state of the system. In some embodiments, the system determines a current state of the system as part of the assessment. The current state defines one or more settings or parameters for responding to the data stream and, in particular, an identified change in a data pattern of the data stream. The parameters of the system state may define actions to be taken in response to the monitored data stream. For example, the system may modify a learning rate or the like or reconfigure neural network architecture at least partially based on the current state of the system. In another example, the system may determine a new state at least partially based on the current state and/or an identified change in a data pattern of the data stream. By leveraging state-based learning modes to enable a particular incremental learning technique, the system is receptive to small data sample sizes allowing the system to adapt to a changing environment without the need to completely recalibrate the system (i.e., complete retraining of the neural network).

In some embodiments, the states may comprise emotional response states of the system, wherein each emotional response state has a separate set of parameters for incremental learning and determining reconfiguration. Emotional response states may have learning rates and other parameters which at least partially attempt to mimic human response to similar emotional responses for enhanced artificial learning. In one example, the system is configured to operate in an excited or scared state, wherein the learning rate is high and/or newly received data points are prioritized and weighted higher. In this way, the system is more receptive to newly received data in the higher state whereby the system may be more receptive to new data and a smaller source of data may have a greater impact. In another example, the system is configured to operate in a calm or relaxed state, wherein the learning rate is neutral or lower whereby the system gradually learns at a lower rate without any single data point having a significant, immediate impact. In yet another embodiment, the system is configured to operate in an alert state, wherein the learning rate may be adaptive based on receiving a particular type of data and/or identifying a change in an established data pattern. In a specific example of the previous embodiment, a security system may be configured to operate in an alert mode, wherein upon detecting motion (i.e., a change in the data pattern), the system is configured to increase the learning rate in response to the event of interest to identify subsequent potential intruder actions.

In yet another example, the system may be configured to operate in a protective or defensive state in response to an adversarial attack or in response to detecting or identifying an input of erroneous data which may adversely affect the learning of the system. In the protective state, the system may place higher weighting on predetermined training data over newly received, real-time data to prevent the adverse effects of the adversarial attack or erroneous data. In some embodiments, erroneous or incorrect data may be intentionally provided to the system as training data. In some embodiments, erroneous data or a change in a data pattern may be indicative of attempted unauthorized access (i.e., misappropriation or security threat). In one example, the system may receive intentionally erroneous data from another system (e.g., a merchant system) through the data stream. In another particular example, the system may receive unauthorized interaction data (e.g., transactions) associated with a user account (e.g., financial account) that has been taken over by an unauthorized user (i.e., misappropriation). The system may be further configured to determine logical inconsistencies in the data stream. For example, the system may flag a change in the data pattern when a user swipes a credit card in-person in New York before the same credit card is detected as being used in-person in Seattle only minutes apart. In an example of another embodiment, the system may be embodied as a robot configured to learn from environmental data of the data stream. In other examples, the system may include a self-driving car, an intrusion detection system for a building of facility, facial recognition or biometrics systems, or any other real-time decision-making AI engine.

In some embodiments, transitions between system states and/or configurations are determined via pre-coded policies, wherein state changes occur only under particular, predetermined conditions, for example, under particular identified changes in the data pattern. In some embodiments, the system further comprises a library of states and configuration alternatives wherein one or more possible states, state changes, alternative configurations, state parameters and the like may be stored. In one embodiment, the library may store predetermined conditions under which state changes may occur. In another embodiment, the library may store predetermined pathways or maps for a progression of possible state changes. For example, under a particular set of conditions, a state may only be allowed to progress to another particular state. In another example, the system may be prevented from progressing to one or more alternative states or the like unless a particular set of conditions are identified by the system or met.

In other embodiments, the system may change states dynamically based on an incoming data stream and/or identified changes therein. In some embodiments, an artificial intelligence system may be configured to learn state changes in real-time as data from the data stream is monitored and data patterns are identified and developed by the system. In another embodiment, the system may determine state changes using a combination of predetermined, policy-based conditional guidelines and learned data patterns. In a particular example, the system may initial be in a predetermined state, wherein the predetermined state is then customized dynamically over time in response to monitoring changes in the data stream in real-time.

In some embodiments, reconfiguration of the system may comprise adding, removing, or otherwise modifying functions, blocks of functions, modules, or the like (e.g., macroinstructions) of the architecture based on a response state of the system and/or an assessment of an incoming data stream. For example, from an assessment of the data stream, the system may determine that the data stream comprises data associated with facial images or pictures of users. In response, the system may add a facial recognition macroinstruction module to assess the incoming data stream.

FIG. 5 provides a high level process map for pre-trained incremental learning with system assessment and reconfiguration, in accordance with one embodiment of the invention. Initially, as illustrated in block 502, the system is pre-trained with broad spectrum representative data before going online and being configured to receive new data in real-time for further learning and decision-making. Alternatively, in some embodiments, the system is configured to run for a predetermined amount of time in a real-time adaptive mode, wherein the system monitors a data stream and to learn and establish one or more data patterns without the influence of the pre-trained data. Similar to FIG. 4, the system monitors and assesses an incoming data stream and assess a current system configuration as illustrated in blocks 504 and 506, respectively. At block 508, the system determines if the current configuration can be improved upon by changing to a new or alternative configuration (i.e., modifying parameters).

When determining one or more alternative configurations, the system reaches out to a configuration-based settings database 513 to consult one or more predetermined policies, conditions for change, specifications, probability and performance metrics, and the like for configurations which, in some embodiments, may provide instruction for determining a change to a new configuration. In some embodiments, the system may further reference system and state settings in addition to the configuration settings as previously discussed. In one embodiment, wherein an alternative configuration is not identified, the process continues to block 510, wherein other adaptive steps within the current configuration are checked. In some embodiments, small adjustments may be made within a current configuration to fine-tune the configuration without changing to a new configuration. The system may then proceed with only minor adjustments in the current configuration 512 and return to monitoring and assessing the data stream 504. In another embodiment, the system may determine to maintain the current configuration without any adjustments.

In the illustrated embodiment, at block 508, using the settings database 513, the system identifies one or more alternative configurations which may improve system performance as illustrated in block 514. The process continues to block 516, wherein the system calculates a magnitude of a change to implement with the new configuration. The system calculates one or more weight levels, unit levels, ensemble levels, layer numbers, total neuron numbers and the like for the new configuration of the neural network. Calculations of magnitudes may be based on a current state or configuration of the system and/or an identified change in the data stream. As illustrated in block 518, after performing calculations, the system proceeds with the changes in the new configuration. In some embodiments, the change in the configuration is a reconfiguration of the neural network architecture.

In a non-limiting embodiment, changes to the neural network architecture include changes to neural network components (e.g., neurons; edges; layers; ensembles; weights of neurons, edges, layers, or ensembles; activation functions and the like). The architecture may be modified by the system by having one or more components added, removed, made inactive, or the like. The system may further modify the functioning or operation of the one or more components of the neural network. For example, the system may add additional neurons to the neural network. In another embodiment, neurons within the neural network architecture may be added or removed incrementally as the neural network learns from the monitored data stream. A total number of neurons may be increased or decreased to a second total number gradually over a period of time during the network learning process. In one embodiment, the neural network may be constructed or modified to include a number of neurons based on a number of inputs into the neural network. For example, the system may add an additional neuron to the network in response to an additional input received from the data stream.

In another example, the system may modify a weight one or more neurons and/or edges. In some embodiments, the system modifies the weights of particular neurons and/or edges differently than others to increase the impact of particular data on the system. In one embodiment, a weighting of one or more neurons and/or edges may be continually modified or recalculated during an iterative reconfiguration process, such as the processes illustrated in FIGS. 4-6, wherein a neural network and incremental learning process is optimized to achieve a desired output. In some embodiments, reweighting may be based on at least one of a system state and the incoming data stream.

In yet another example, the system is configured to form or disband one or more ensembles from one or more neural networks in response to a system state and/or the incoming data stream. Furthermore the system may modify weights of individual neurons and weights within any neural networks of the ensemble. In another example, the system is configured to modify a depth of the neural network, wherein the system may add, remove, or otherwise modify a number of layers of the neural network (e.g., input layer, output layer, hidden layers). Additionally, the system may generate or modify one or more connectors or multiplexers between neurons or layers of the neural network. In another embodiment, the system may be configured to reconfigure the architecture of the neural network in order to improve energy efficiency of hardware associated with operation of the neural network and optimize use of one or more computing resources.

Following implementation of the new configuration having new parameters, the process continues back to block 504, wherein the system continues to monitor and assess the incoming data stream under the new configuration and parameters.

FIG. 6 provides a high level process map for hybrid incremental learning with system assessment and reconfiguration, in accordance with one embodiment of the invention. Initially, as illustrated in block 602, the system is pre-trained with broad spectrum representative data before going online and being configured to receive new data in real-time for further learning and decision-making. Alternatively, in some embodiments, the system is configured to run for a predetermined amount of time in a real-time adaptive mode, wherein the system monitors a data stream and to learn and establish one or more data patterns without the influence of the pre-trained data. Similar to FIG. 4, the system monitors and assesses an incoming data stream and assess a current system configuration as illustrated in blocks 604 and 606, respectively. At block 608, the system determines if the current configuration can be improved upon by changing to a new or alternative configuration (i.e., modifying parameters). In the illustrated hybrid embodiment, the system may check with the configuration based settings database 613 similar to the embodiment of FIG. 5, however the system also combines the predetermined policies with real-time decision making based on the monitored data stream. The database 613 may comprise one or more predetermined policies, conditions for change, specifications, probability and performance metrics, and the like for configurations which, in some embodiments, may provide instruction for determining a change to a new configuration in combination with the real-time decisioning of the system. In some embodiments, the system may further reference system and state settings in addition to the configuration settings as previously discussed. In one embodiment, wherein an alternative configuration is not identified, the process continues to block 610, wherein other adaptive steps within the current configuration are checked. In some embodiments, small adjustments may be made within a current configuration to fine-tune the configuration without changing to a new configuration. The system may then proceed with only minor adjustments in the current configuration 612 and return to monitoring and assessing the data stream 604. In another embodiment, the system may determine to maintain the current configuration without any adjustments.

In the illustrated embodiment, at block 608, using the real-time decision making of the system alone or in combination with the settings database 613, the system identifies one or more alternative configurations which may improve system performance. As illustrated in block 614, in one embodiment, the system evaluates the one or more identified alternative configurations by calculating probability cost, benefit cost, change cost, or the like. In the illustrated embodiment, the system selects an alternative configuration based on the performed evaluation. As illustrated in block 616, the system may alternatively determine and execute greedy, incremental changes to the system configuration (i.e., change parameters), wherein more aggressive changes are made gradually to the system and configuration as changes to the data pattern of the data stream are monitored.

As illustrated in block 618, the system evaluates adversarial scenarios and calculates an estimated probability associated with the scenarios. In one embodiment, in response to an adversarial attack or scenario, wherein the system identifies an input of erroneous data in the data stream, the system is configured to reconfigure the configuration to a predetermined state, wherein in the predetermined state, the system is configured to weight the predetermined training data higher than real-time data which may contain erroneous data. In a more specific embodiment, the system is further configured to ignore the real-time data in response to identifying that the real-time data contains erroneous data and only monitor the predetermined training data for learning and decisioning.

The process flow continues to block 620, wherein the system determines a new, target configuration based on one or more of the current state of the system, the incoming data stream, and the evaluation and probability scoring performed in blocks 614-618. In one embodiment, the new configuration is selected for increasing system performance in response to an event, a change in the data pattern of the data stream, or a system state. At block 622, the system proceeds with the changes in the new configuration. In some embodiments, the change in the configuration is a reconfiguration of the neural network architecture.

In a non-limiting embodiment, changes to the neural network architecture include changes to neural network components (e.g., neurons; edges; layers; ensembles; weights of neurons, edges, layers, or ensembles; activation functions and the like). The architecture may be modified by the system by having one or more components added, removed, made inactive, or the like. The system may further modify the functioning or operation of the one or more components of the neural network. For example, the system may add additional neurons to the neural network. In another embodiment, neurons within the neural network architecture may be added or removed incrementally as the neural network learns from the monitored data stream. A total number of neurons may be increased or decreased to a second total number gradually over a period of time during the network learning process. In one embodiment, the neural network may be constructed or modified to include a number of neurons based on a number of inputs into the neural network. For example, the system may add an additional neuron to the network in response to an additional input received from the data stream.

In another example, the system may modify a weight one or more neurons and/or edges. In some embodiments, the system modifies the weights of particular neurons and/or edges differently than others to increase the impact of particular data on the system. In one embodiment, a weighting of one or more neurons and/or edges may be continually modified or recalculated during an iterative reconfiguration process, such as the processes illustrated in FIGS. 4-6, wherein a neural network and incremental learning process is optimized to achieve a desired output. In some embodiments, reweighting may be based on at least one of a system state and the incoming data stream.

In yet another example, the system is configured to form or disband one or more ensembles from one or more neural networks in response to a system state and/or the incoming data stream. Furthermore the system may modify weights of individual neurons and weights within any neural networks of the ensemble. In another example, the system is configured to modify a depth of the neural network, wherein the system may add, remove, or otherwise modify a number of layers of the neural network (e.g., input layer, output layer, hidden layers). Additionally, the system may generate or modify one or more connectors or multiplexers between neurons or layers of the neural network. In another embodiment, the system may be configured to reconfigure the architecture of the neural network in order to improve energy efficiency of hardware associated with operation of the neural network and optimize use of one or more computing resources.

Following implementation of the new configuration having new parameters, the process continues back to block 604, wherein the system continues to monitor and assess the incoming data stream under the new configuration and parameters. In some embodiments, the process flow of FIG. 6 is an iterative process, wherein the system is adapted or refined over time based on the data stream.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with state-based learning and neural network reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/197,193 | SYSTEM AND METHOD FOR INCREMENTAL LEARNING THROUGH STATE-BASED REAL-TIME ADAPTATIONS IN NEURAL NETWORKS | Concurrently herewith |

What is claimed is:

1. An artificial intelligence system for reconfiguring system architecture responsive to a system state, the system comprising:
   a controller configured for modifying an artificial intelligence learning engine, wherein the artificial intelligence learning engine comprises a neural network, and wherein the controller comprises at least one memory device with computer-readable program code stored thereon, at least one communication device connected to a network, and at least one processing device, wherein the at least one processing device is configured to execute the computer-readable program code to:
      monitor a data stream having a data pattern by comparing the data pattern to a trained data pattern, wherein the data stream comprises information associated with past transactions associated with an account of a user, current transactions associated with the account of the user, and scheduled transactions associated with the account of the user;
      identify a change in the data pattern of the data stream; stream, wherein the change comprises the user accessing the account via an unrecognized user device;
      assess a fidelity of the data stream based on the change in the data pattern;
      determine an adaptation rate of the artificial intelligence learning engine to the data stream based on the fidelity of the data stream; and
      in response to identifying the change in the data pattern and based on the fidelity of the data stream and the adaptation rate of the artificial intelligence learning engine, reconfigure an architecture of the neural network to improve energy efficiency of hardware associated with operation of the neural network by:
         calculating, based on the change in the data pattern of the data stream, a weight level of a neuron participating in the neural network and modifying a weight of the neuron based on the calculated weight level;
         calculating, based on the change in the data pattern of the data stream, a weight level of an edge within the neural network and modifying a weight of the edge based on the calculated weight level, or
         calculating, based on the change in the data pattern of the data stream, an ensemble level of an ensemble of the neural network and modifying the ensemble based on the calculated ensemble level.

2. The system of claim 1, wherein determining the adaptation rate of the artificial intelligence learning engine further comprises identifying that the fidelity of the data stream is below a predetermined threshold and, in response, decreasing a learning rate of the artificial intelligence learning engine for streaming data received from the data stream.

3. The system of claim 2, wherein decreasing the learning rate of the artificial intelligence learning engine comprises weighting predetermined training data higher than the streaming data received from the data stream.

4. The system of claim 1, wherein the at least one processing device is configured to execute the computer-readable program code to, when reconfiguring the architecture of the neural network, modify a macroinstruction, or modify an activation function.

5. The system of claim 4, wherein the at least one processing device is configured to execute the computer-readable program code to, when reconfiguring the architecture of the neural network, reconfigure the architecture of the neural network based on one or more neural network parameters defined by the response state of the artificial intelligence learning engine.

6. The system of claim 1 wherein the at least one processing device is configured to execute the computer-readable program code to, when reconfiguring the architecture of the neural network, reconfigure the architecture of the neural network by:
continually modified calculating the weight level of the neuron participating in the neural network and modifying the weight of the neuron based on the calculated weight level during an iterative reconfiguration process; and
continually calculating the weight level of the edge within the neural network and modifying the weight of the edge based on the calculated weight level during an iterative reconfiguration process.

7. An artificial intelligence system for reconfiguring system architecture responsive to a system state, the system comprising:
a controller configured for modifying an artificial intelligence learning engine, wherein the artificial intelligence learning engine comprises a neural network, and wherein the controller comprises at least one memory device with computer-readable program code stored thereon, at least one communication device connected to a network, and at least one processing device, wherein the at least one processing device is configured to execute the computer-readable program code to:
monitor a data stream having a data pattern by comparing the data pattern to a trained data pattern, wherein the data stream comprises information associated with past transactions associated with an account of a user, current transactions associated with the account of the user, and scheduled transactions associated with the account of the user;
identify a change in the data pattern of the data stream; stream, wherein the change comprises the user accessing the account via an unrecognized user device;
determine a response state of the artificial intelligence learning engine, the response state defining one or more neural network parameters for monitoring the data stream with the artificial intelligence learning engine; and
in response to identifying the change in the data pattern and determining based on the response state, reconfigure an architecture of the neural network to improve energy efficiency of hardware associated with operation of the neural network by:
calculating, based on the change in the data pattern of the data stream, a weight level of a neuron participating in the neural network and modifying a weight of the neuron based on the calculated weight level;
calculating, based on the change in the data pattern of the data stream, a weight level of an edge within the neural network and modifying a weight of the edge based on the calculated weight level, or
calculating, based on the change in the data pattern of the data stream, an ensemble level of an ensemble of the neural network and modifying the ensemble based on the calculated ensemble level.

8. The system of claim 7, wherein the at least one processing device is configured to execute the computer-readable program code to, when reconfiguring the architecture of the neural network, modify a macroinstruction, or modify an activation function.

9. The system of claim 8, wherein the at least one processing device is configured to execute the computer-readable program code to, when reconfiguring the architecture of the neural network, modify a number of neurons participating in the neural network incrementally from a first total number of neurons to a second total number of neurons as the artificial intelligence learning engine learns from the data stream over a period of time.

10. The system of claim 8, wherein the at least one processing device is configured to execute the computer-readable program code to, when reconfiguring the architecture of the neural network, modify a number of neurons participating in the neural network based on a number of inputs received by the artificial intelligence learning engine.

11. The system of claim 7 wherein the at least one processing device is configured to execute the computer-readable program code to, when reconfiguring the architecture of the neural network, reconfigure the architecture of the neural network by:
continually calculating the weight level of the neuron participating in the neural network and modifying the weight of the neuron based on the calculated weight level during an iterative reconfiguration process; and
continually calculating the weight level of the edge within the neural network and modifying the weight of the edge based on the calculated weight level during an iterative reconfiguration process.

12. The system of claim 7, wherein the at least one processing device is further configured to form or disband an ensemble of the artificial intelligence learning engine and one or more additional neural networks based on at least one of the response state and the data stream.

13. The system of claim 7, wherein the at least one processing device is configured to execute the computer-readable program code to, when reconfiguring the architecture of the neural network, reconfigure the architecture of the neural network to improve the energy efficiency of the hardware associated with operation of the neural network by:
modifying a depth of the artificial intelligence learning engine; and
modifying a number of layers within the artificial intelligence learning engine.

14. The system of claim 13, wherein the at least one processing device is configured to execute the computer-readable program code to, when modifying the number of layers within the artificial intelligence learning modify at least one of an input layer, an output layer, and a hidden layer of the artificial intelligence learning engine.

15. The system of claim 7, wherein the at least one processing device is configured to execute the computer-readable program code to:
assess a fidelity of the data stream based on the change in the data pattern;
determine an adaptation rate of the artificial intelligence learning engine to the data stream based on the fidelity of the data stream.

16. The system of claim 7, wherein the at least one processing device is configured to execute the computer-readable program code to:
determine, after reconfiguring the architecture of the neural network, a new response state of the artificial intelligence learning engine; and
in response to reconfiguring the architecture of the neural network and based on determining the new response state, reconfigure an architectural configuration of the artificial intelligence learning engine.

17. A computer-implemented method for reconfiguring artificial intelligence system architecture responsive to a system state, the system comprising:
providing a controller configured for modifying an artificial intelligence learning engine, wherein the artificial intelligence learning engine comprises a neural network, and wherein the controller comprises at least one memory device with computer-readable program code stored thereon, at least one communication device connected to a network, and at least one processing device, wherein the at least one processing device is configured to execute the computer-readable program code to:
monitor a data stream having a data pattern by comparing the data pattern to a trained data pattern, wherein the data stream comprises information associated with past transactions associated with an account of a user, current transactions associated with the account of the user, and scheduled transactions associated with the account of the user;
identify a change in the data pattern of the data stream; stream, wherein the change comprises the user accessing the account via an unrecognized user device;
assess a fidelity of the data stream based on the change in the data pattern;
determine an adaptation rate of the artificial intelligence learning engine to the data stream based on the fidelity of the data stream; and
in response to identifying the change in the data pattern and based on the fidelity of the data stream and the adaptation rate of the artificial intelligence learning engine, reconfigure an architecture of the neural network to improve energy efficiency of hardware associated with operation of the neural network by:
calculating, based on the change in the data pattern of the data stream, a weight level of a neuron participating in the neural network and modifying a weight of the neuron based on the calculated weight level;
calculating, based on the change in the data pattern of the data stream, a weight level of an edge within the neural network and modifying a weight of the edge based on the calculated weight level, or
calculating, based on the change in the data pattern of the data stream, an ensemble level of an ensemble of the neural network and modifying the ensemble based on the calculated ensemble level.

18. The computer-implemented method of claim 17, wherein determining the adaptation rate of the artificial intelligence learning engine further comprises identifying that the fidelity of the data stream is below a predetermined threshold and, in response, decreasing a learning rate of the artificial intelligence learning engine for streaming data received from the data stream.

19. The computer-implemented method of claim 18, wherein decreasing the learning rate of the artificial intelligence learning engine comprises weighting predetermined training data higher than the streaming data received from the data stream.

20. The computer-implemented method of claim 17, wherein the at least one processing device is configured to execute the computer-readable program code to, when reconfiguring the architecture of the neural network, modify a macroinstruction, or modify an activation function.

* * * * *